(12) United States Patent
Shinotsuka et al.

(10) Patent No.: US 6,426,936 B1
(45) Date of Patent: Jul. 30, 2002

(54) PHASE-CHANGE MEDIUM USABLE IN PHASE-DIFFERENCE TRACKING

(75) Inventors: Michiaki Shinotsuka; Hajime Yuzurihara; Hiroshi Deguchi; Hiroko Tashiro, all of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/236,446

(22) Filed: Jan. 25, 1999

(30) Foreign Application Priority Data

Jan. 27, 1998 (JP) .......................................... 10-013661

(51) Int. Cl.⁷ ................................................ G11B 7/24
(52) U.S. Cl. ............... 369/275.2; 428/64.4; 430/270.13
(58) Field of Search ........................ 369/275.1, 275.2, 369/13, 275.4, 284, 288; 430/270.13; 428/64.1, 64.4, 64.5, 64.2, 64.3

(56) References Cited

U.S. PATENT DOCUMENTS

| | | | | |
|---|---|---|---|---|
| 5,506,022 A | * | 4/1996 | Ide ............................ | 428/64.1 |
| 5,569,517 A | * | 10/1996 | Tominaga et al. ......... | 428/64.1 |
| 5,736,657 A | | 4/1998 | Ide et al. | |
| 5,785,828 A | * | 7/1998 | Yamada et al. ........ | 204/298.13 |
| 6,108,295 A | * | 8/2000 | Ohno et al. .............. | 369/275.2 |
| 6,143,468 A | * | 11/2000 | Ohno et al. ............ | 430/270.13 |
| 6,221,557 B1 | * | 4/2001 | Harigaya et al. ...... | 430/270.13 |

FOREIGN PATENT DOCUMENTS

| | | |
|---|---|---|
| JP | 56-30610 | 7/1981 |
| JP | 2-56734 | 12/1990 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

A product for recording information by use of laser light includes a recording layer being able to change between an amorphous state and a crystalline state so as to record information, the recording layer having a thickness falling within a first range defined relative to a wavelength of the laser light, a protection layer having a thickness falling within a second range defined relative to the wavelength of the laser light, a heat releasing layer having a thickness falling within a third range defined relative to the wavelength of the laser light, and a transparent substrate supporting the layers. The first, second, and third ranges are selected such that a phase of the laser light reflected by the amorphous state and a phase of the laser light reflected by the crystalline state have a phase difference larger than a predetermined phase amount.

16 Claims, 7 Drawing Sheets

FIG. 3

| RECORDING-LAYER THICKNESS (nm) | OUTPUT MAGNITUDE (V) | JITTER ($\sigma/T_w$ (%)) |
|---|---|---|
| 13 (0.020 × $\lambda$) | 0.20 | 10 |
| 17 (0.027 × $\lambda$) | 0.25 | 7 |
| 21 (0.033 × $\lambda$) | 0.30 | 8 |
| 25 (0.039 × $\lambda$) | 0.31 | 10 |
| 33 (0.052 × $\lambda$) | 0.31 | 11 |

FIG. 4

| PROTECTION-LAYER THICKNESS (nm) | OUTPUT MAGNITUDE (V) | JITTER ($\sigma/T_w$ (%)) |
|---|---|---|
| 45 (0.126 × $\lambda$) | 0.25 | 10 |
| 85 (0.13 × $\lambda$) | 0.10 | 12 |
| 125 (0.20 × $\lambda$) | 0.20 | 8 |
| 165 (0.26 × $\lambda$) | 0.25 | 8 |
| 205 (0.32 × $\lambda$) | 0.21 | 9 |
| 245 (0.39 × $\lambda$) | 0.12 | 23 |

FIG.5

| HEAT-RELEASING LAYER THICKNESS(nm) | OUTPUT MAGNITUDE(V) | JITTER ($\sigma$/Tw(%)) |
|---|---|---|
| 40 (0.063 × $\lambda$) | 0.25 | 12 |
| 80 (0.13 × $\lambda$) | 0.26 | 8 |
| 120 (0.19 × $\lambda$) | 0.26 | 8 |
| 160 (0.25 × $\lambda$) | 0.25 | 8 |
| 200 (0.31 × $\lambda$) | 0.26 | 10 |

FIG.6

| PROTECTION-LAYER THICKNESS(nm) | OUTPUT MAGNITUDE (V) | JITTER ($\sigma$/Tw(%)) |
|---|---|---|
| 12 (0.019 × $\lambda$) | 0.22 | 11 |
| 16 (0.025 × $\lambda$) | 0.25 | 8 |
| 20 (0.031 × $\lambda$) | 0.26 | 8 |
| 24 (0.038 × $\lambda$) | 0.28 | 8 |
| 28 (0.044 × $\lambda$) | 0.29 | 10 |

FIG. 7

| RECORDING MATERIAL | OUTPUT MAGNITUDE (V) | JITTER (σ/Tw (%)) |
|---|---|---|
| Ag-In-Sb-Te | 0.25 | 8 |
| Ge-Sb Te | 0.18 | 12 |

FIG. 8

| REFLECTIVITY (AMORPHOUS) / REFLECTIVITY (CRYSTAL) | PHASE-DIFFERENCE TRACKING |
|---|---|
| 40% | FAILED |
| 50% | OK |
| 60% | OK |

FIG. 9

| GROOVE DEPTH (nm) | JITTER (σ/Tw(%)) | OUTPUT MAGNITUDE (V) |
|---|---|---|
| 30 | 13 | 0.13 |
| 40 | 8 | 0.25 |
| 50 | 8 | 0.27 |
| 60 | 9 | 0.25 |
| 70 | 10 | 0.22 |
| 80 | 12 | 0.19 |

FIG. 10

| TRACK PITCH (μm) | OUTPUT MAGNITUDE (V) |
|---|---|
| 0.5 | 0.10 |
| 0.6 | 0.20 |
| 0.7 | 0.25 |
| 0.8 | 0.26 |
| 0.9 | 0.19 |

FIG. 11

| GROOVE WIDTH (nm) | JITTER (σ/Tw (%)) | OUTPUT MAGNITUDE (V) |
|---|---|---|
| 0.20 | 11 | 0.18 |
| 0.25 | 9 | 0.23 |
| 0.30 | 8 | 0.25 |
| 0.40 | 8 | 0.21 |
| 0.45 | 10 | 0.2 |
| 0.50 | 11 | 0.2 |

PHASE-CHANGE MEDIUM USABLE IN PHASE-DIFFERENCE TRACKING

BACKGROUND OF THE INVENTION

1. Field of the Invention

The present invention relates to an optical phase-change recording medium which records and erases information by changing a phase of a recording layer between an amorphous state and a crystalline state.

2. Description of the Related Art

A DVD-RAM, which permits recording, reproduction, and erasure of information, has been attracting wide attention as it has advantages over a DVD-ROM, which is only capable of reproduction, and a DVD-R, which is only capable of recording and reproduction.

In regard to an optical-disk drive, a scheme that obtains a tracking-error signal through phase-difference tracking is known in the art. Reference may be made to Japanese Patent Publication No. 56-30610 and Japanese Patent Publication No. 2-56734, the contents of which are hereby incorporated by reference. In this scheme, a laser-beam spot is scanned over a recording track, which is comprised of a series of reflection pits each formed as a lump or a recess. An optical phase of reflected light is then modulated so as to detect a change in an opticalintensity distribution observed on a receiver device. Based on this change, a displacement of the series of pits from an expected center thereof is detected. A position of the laser-beam spot is subjected to servo control to minimize the displacement, thereby effecting appropriate tacking.

No optical phase-change recording medium; however, is known to date which has a memory capacity comparable to that of the DVD-ROM and can be driven by a DVD-ROM drive.

One of the reasons why such medium does not exist is that optical phase-change recording media usually exhibit a low reflectivity and allow only a small degree of amplitude modulation to be obtained, as physical and signal characteristics are concerned. Such characteristics result in an insufficient signal magnitude. Because of this reason, it is difficult to drive a DVD-RAM in the same manner as driving DVD-ROM in a DVD-ROM drive. Particularly, a phase-difference tracking signal, which is necessary for tracking a series of pits, cannot be obtained in a sufficient magnitude, giving rise to a problem in that the tracking control becomes unstable.

Accordingly, there is a need for an optical phase-change medium which permits appropriate phase-difference tracking.

SUMMARY OF THE INVENTION

Accordingly, it is a general object of the present invention to provide an optical phase-change medium which can satisfy the need described above.

It is another and more specific object of the present invention to provide an optical phase-change medium which permits appropriate phase-difference tracking.

In order to achieve the above objects according to the present invention, a product for recording information by use of laser light includes a recording layer being able to change between an amorphous state and a crystalline state so as to record information, the recording layer having a thickness falling within a first range defined relative to a wavelength of the laser light, a protection layer having a thickness falling within a second range defined relative to the wavelength of the laser light, a heat releasing layer having a thickness falling within a third range defined relative to the wavelength of the laser light, and a transparent substrate supporting the layers. The first, second, and third ranges are selected such that a phase of the laser light reflected by the amorphous state and a phase of the laser light reflected by the crystalline state have a phase difference larger than a predetermined phase amount.

According to one aspect of the present invention, the phase difference is substantially larger than 10°. The larger the phase difference, the greater the output of phase-difference tracking becomes. As a matter of fact, the phase-difference-tracking output exceeds 0.3 V when the optical phase difference is lager than 10°. This means that an output level comparable to that of the DVD-ROM is obtained even when phase-difference tracking is employed. Namely, the optical phase-change recording medium as described above can be played on a DVD-ROM player.

Other objects and further features of the present invention will be apparent from the following detailed description when read in conjunction with the accompanying drawings.

BRIEF DESCRIPTION OF THE DRAWINGS

FIG. 3 is a table chart showing phase-difference-tracking output magnitudes and jitters which were measured for different thicknesses of a recording layer;

FIG. 4 is a table chart showing phase-difference-tracking output magnitudes and jitters which were measured for different thicknesses of a lower protection layer placed between a transparent substrate and the recording layer;

FIG. 5 is a table chart showing phase-difference-tracking output magnitudes and jitters which were measured for different thicknesses of a heat releasing layer;

FIG. 6 is a table chart showing phase-difference-tracking output magnitudes and jitters which were measured for different thicknesses of an upper protection layer;

FIG. 7 is a table chart showing phase-difference-tracking output magnitudes and jitters which were measured for different materials used as the recording layer;

FIG. 8 is a table chart showing whether it was possible to achieve phase-difference tracking under different conditions in which a ratio of an amorphous-state reflectivity to a crystalline-state reflectivity was changed;

FIG. 9 is a table chart showing phase-difference-tracking output magnitudes and jitters which were measured for different groove depths of the transparent substrate;

FIG. 10 is a table chart showing phase-difference-tracking output magnitudes which were measured for different track pitches of the optical phase-change recording medium;

FIG. 11 is a table chart showing phase-difference-tracking output magnitudes and jitters which were measured for different groove widths of the transparent substrate.

DESCRIPTION OF THE PREFERRED EMBODIMENTS

In the following, a principle and embodiments of the present invention will be described with reference to the accompanying drawings.

Figure 1:
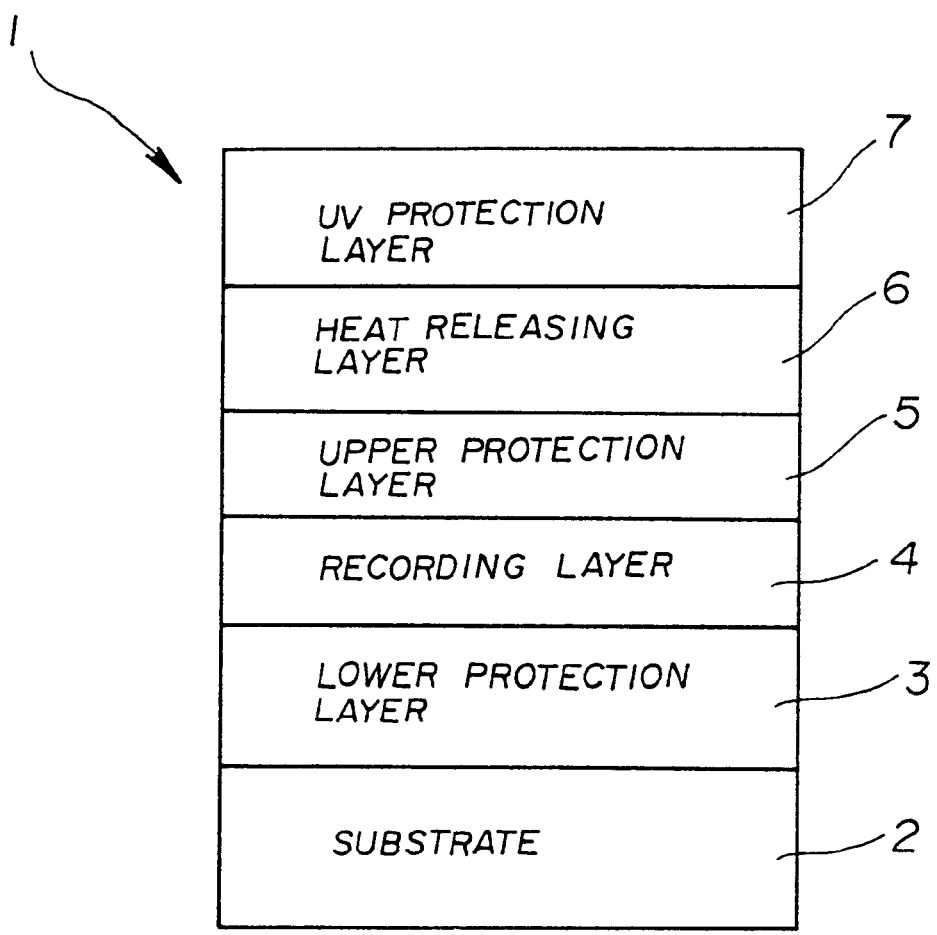
FIG. 1 is an illustrative drawing showing layers of an optical phase-change recording medium according to an embodiment of the present invention.

FIG. 1 is an illustrative drawing showing layers of an optical phase-change recording medium 1 according to an embodiment of the present invention.

As shown in the figure, the optical phase-change recording medium 1 includes a transparent substrate 2 made of polycarbonate or the like and other layers formed one over another on the transparent substrate 2. These layers include a lower protection layer 3 (e.g., made of a phase-change material such as ZnS, $SiO_2$, or $SiN_x$), a recording layer 4 (e.g., made of AgInSbTe, GeSbTe, or the like), a upper protection layer 5 (e.g., made of $ZnS.SiO_2$, $SiN_x$), a heat releasing layer 6 (e.g., made of Al, Al alloy, Au, Ag, or the like), and a UV protection layer 7 (e.g., made of a UV-curable resin). The present invention is not limited to this particular layer structure and particular materials. This layer structure and particular materials are preferable, however, because sufficient characteristics are achieved in terms of recording, reproduction, and erasure of information. The optical phase-change recording medium 1 may be formed as a disk, a card, a sheet, or whatever shape that may be appropriate.

The optical phase-change recording medium 1 having a multi-layer structure as described above has carefully selected specifications as described in the following. These specifications are intended to provide a phase-difference tracking signal of a sufficient magnitude comparable to that of the DVD-ROM, thereby making it possible to play the medium on a DVD-ROM player.

[1] Optical Phase Difference Larger Than 10°

Figure 2:
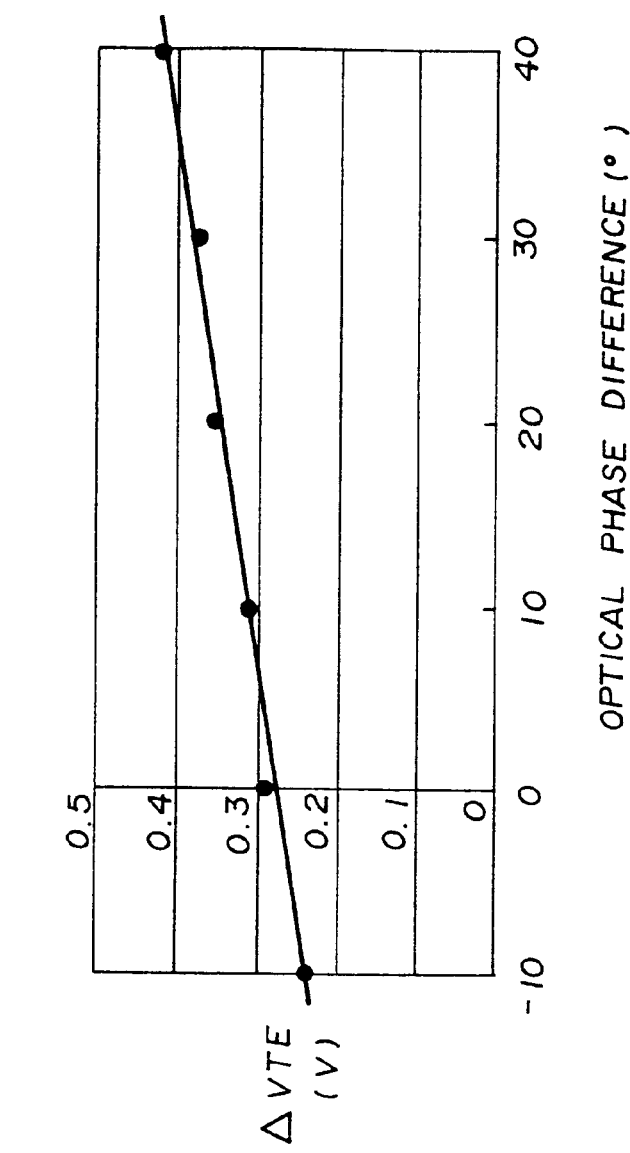
FIG. 2 is a chart showing a relation between a phase-difference-tracking output magnitude and an optical phase difference of the optical phase-change recording medium.

FIG. 2 is a chart showing a relation between a phase-difference-tracking output magnitude and an optical phase difference of the optical phase-change recording medium 1. The optical phase difference is defined as "$\Phi 1 - \Phi 2$", where $\Phi$ represents a phase of light reflected by an amorphous-state mark recorded in the recording layer 4, and $\Phi 2$ represents a phase of light reflected by a crystalline-state portion. As shown in FIG. 2, the phase-difference-tracking output magnitude exceeds 0.3 V when the optical phase difference is lager than 10°. This means that an output level comparable to that of the DVD-ROM is obtained even when phase-difference tracking is employed. Namely, the optical phase-change recording medium 1 can be played on a DVD-ROM player.

[2] Thickness of Record Layer 0.027 to 0.033 Times Wavelength of Laser Light

FIG. 3 is a table chart showing phase-difference-tracking output magnitudes and jitters which were measured for different thicknesses of the recording layer 4. Measurements shown in the table were obtained under such conditions as follows. The wavelength L of the laser light was 635 [nm], and the numerical aperture NA was 0.6 with respect to an object lens of the optical pick-up device. The line density of the track was 0.3 [μm/bit]. Also, the signal format used for measurement was EFM modulation.

Further, the following is the specifics with regard to the optical phase-change recording medium 1. AgInSbTe was used for the recording layer 4. $ZnS.SiO_2$ was used for the lower protection layer 3, the thickness of which was 160 nm. The upper protection layer 5 was formed from $ZnS.SiO_2$, and had a layer thickness of 20 nm. Also, the heat releasing layer 6 was formed from an Al alloy, and a layer thickness thereof was 120 nm.

As shown in FIG. 3, the phase-difference-tracking output magnitude was as large as or larger than 0.25 V when the layer thickness of the recording layer 4 was 0.027 to 0.033 times the wavelength of the laser light. Under this condition, also, jitters were just as favorable as they should be. In this manner, an output level as high as that of the DVD-ROM can be obtained even when phase-difference tracking is employed. The optical phase-change recording medium 1 can thus be driven by a DVD-ROM player.

[3] Thickness of Lower Protective Layer 0.20 to 0.32 Times Wavelength of Laser Light FIG. 4 is a table chart showing phase-difference-tracking output magnitudes and jitters which were measured for different thicknesses of the lower protection layer 3 placed between the transparent substrate 2 and the recording layer 4. Measurements shown in the table were obtained under such conditions as follows. The wavelength L of the laser light was 635 [nm], and the line density of the track was 0.3 [μm/bit]. (This line density is only an example, and recording of the media can be successful with a jitter less than 10% if the line density of the track is greater than 2.5 [μm/bit].) Also, the signal format used for measurement was EFM modulation.

As shown in FIG. 4, the phase-difference-tracking output magnitude was as large as or larger than 0.20 V when the layer thickness of the lower protection layer 3 was 0.20 to 0.32 times the wavelength of the laser light. Under this condition, also, jitters were just as favorable as they should be. In this manner, an output level as high as that of the DVD-ROM can be obtained even when phase-difference tracking is employed. The optical phase-change recording medium 1 can thus be driven by a DVD-ROM player.

Here, the following is the specifics with regard to the optical phase-change recording medium 1. $ZnS.SiO_2$ was used for the lower protection layer 3. AgInSbTe was used for the recording layer 4, the thickness of which was 17 nm. The upper protection layer 5 was formed from $ZnS.SiO_2$, and had a layer thickness of 20 nm. Also, the heat releasing layer 6 was formed from an Al alloy, and a layer thickness thereof was 120 nm.

[4] Thickness of Heat Releasing Layer 0.13 to 0.25 Times Wavelength of Laser Light FIG. 5 is a table chart showing phase-difference-tracking output magnitudes and jitters which were measured for different thicknesses of the heat releasing layer 6. Measurements shown in the table were obtained under such conditions as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The heat releasing layer 6 was formed for example from a metal layer such as an Al alloy. $ZnS.SiO_2$ was used for the lower protection layer 3, the thickness of which was 160 nm. AgInSbTe was used for the recording layer 4, and the layer thickness thereof was 17 nm. The upper protection layer 5 was formed from $ZnS.SiO_2$, and had a layer thickness of 20 nm.

As shown in FIG. 5, the phase-difference-tracking output magnitude was as large as or larger than 0.25 V, and jitters were just as favorable as they should be when the layer thickness of the heat releasing layer 6 was 0.13 to 0.25 times the wavelength of the laser light. In this manner, an output level as high as that of the DVD-ROM can be obtained even when phase-difference tracking is employed. The optical phase-change recording medium 1 can thus be driven by a DVD-ROM player.

[5] Thickness of Upper Protective Layer 0.025 to 0.038 Times Wavelength of Laser Light FIG. 6 is a table chart showing phase-difference-tracking output magnitudes and jitters which were measured for different thicknesses of the upper protection layer 5. Measurements shown in the table were obtained under such conditions as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The upper protection layer 5 was formed from $ZnS.SiO_2$. $ZnS.SiO_2$ was used for the lower protection layer 3, the thickness of which was 160 nm. AgInSbTe was used for the recording layer 4, and the layer thickness thereof was 17 nm. The heat releasing layer 6 was formed from an Al alloy, and had a layer thickness of 120 nm.

As shown in FIG. 6, the phase-difference-tracking output magnitude was as large as or larger than 0.25 V, and jitters were just as favorable as they should be when the layer thickness of the upper protection layer 5 was 0.025 to 0.038 times the wavelength of the laser light. In this manner, an output level as high as that of the DVD-ROM can be obtained even when phase-difference tracking is employed. The optical phase-change recording medium 1 can thus be driven by a DVD-ROM player.

[6] Record Layer Including Ag, In, Sb, and Te

FIG. 7 is a table chart showing phase-difference-tracking output magnitudes and jitters which were measured for different materials used as the recording layer 4. Measurements shown in the table were obtained under such conditions as follows. The wavelength L of the laser light was 635 [nm], and the line density of the track was 0.3 [μm/bit]. Also, the signal format used for measurement was EFM modulation. Record material used here was either AgInSbTe or GeSbTe.

Further, the following is the specifics with regard to the optical phase-change recording medium 1. The recording layer 4 had a thickness thereof equal to 17 nm. The upper protection layer 5 was formed from $ZnS.SiO_2$, and had a layer thickness of 20 nm. The lower protection layer 3 was made of $ZnS.SiO_{12}$, and a layer thickness thereof was 160 nm. Further, the heat releasing layer 6 was an Al alloy with a layer thickness of 120 nm.

As shown in FIG. 7, the phase-difference-tracking output magnitude was as large as 0.25 V, and jitters were just as favorable as they should be when AgInSbTe was used for the recording layer 4. In this manner, an output level as high as that of the DVD-ROM can be obtained even when phase-difference tracking is employed. The optical phase-change recording medium 1 can thus be driven by a DVD-ROM player.

When a material such as GeSbTe was used, jitters undesirably exceeded 10% under the employed condition of line density, i.e., 0.3 μm/bit. In addition, the phase-difference-tracking output magnitude was smaller with this material. This means that appropriate tracking cannot be conducted.

[7] Reflectivity of Amorphous State Larger Than 50% of Reflectivity of Crystalline State FIG. 8 is a table chart showing whether it was possible to achieve phase-difference tracking under different conditions in which a ratio (Ra/Rc) of amorphous-state reflectivity Ra to crystalline-state reflectivity Rc was changed. Other specific conditions were as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The recording layer 4 was AgInSbTe with a layer thickness of 17 nm. The upper protection layer 5 was formed from $ZnS.SiO_2$, and had a layer thickness of 20 nm. The lower protection layer 3 was made of $ZnS.SiO_{12}$, and a layer thickness thereof was 160 nm. Further, the heat releasing layer 6 was an Al alloy with a layer thickness of 120 nm.

As shown in FIG. 8, it was possible to establish phase-difference tracking when the ratio Ra/Rc was no smaller than 50%. In this manner, an output level as high as that of the DVD-ROM can be obtained even when phase-difference tracking is employed. The optical phase-change recording medium 1 can thus be driven by a DVD-ROM player.

[8] Transparent Substrate Having Groove Depth of 40 to 60 nm

FIG. 9 is a table chart showing phase-difference-tracking output magnitudes and jitters which were measured for different groove depths of the transparent substrate 2. Measurements shown in the table were obtained under such conditions as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The recording layer 4 was AgInSbTe with a layer thickness of 17 nm. The upper protection layer 5 was formed from $ZnS.SiO_2$, and had a layer thickness of 20 nm. The lower protection layer 3 was made of $ZnS.SiO_{12}$, and a layer thickness thereof was 160 nm. Further, the heat releasing layer 6 was an Al alloy with a layer thickness of 120 nm.

As shown in FIG. 7, the phase-difference-tracking output magnitude was as large as or larger than 0.25 V, and jitters were just as favorable as they should be when the groove depth of the transparent substrate 2 ranged from 40 to 60 nm. In this manner, an output level as high as that of the DVD-ROM can be obtained even when phase-difference tracking is employed. The optical phase-change recording medium 1 can thus be driven by a DVD-ROM player.

[9] Track Pitch Ranging 0.6 μm–0.8 μm

FIG. 10 is a table chart showing phase-difference-tracking output magnitudes which were measured for different track pitches of the optical phase-change recording medium 1. Measurements shown in the table were obtained under such conditions as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The recording layer 4 was AgInSbTe with a layer thickness of 17 nm. The upper protection layer 5 was formed from $ZnS.SiO_2$, and had a layer thickness of 20 nm. The lower protection layer 3 was made of $ZnS.SiO_{12}$, and a layer thickness thereof was 160 nm. Further, the heat releasing layer 6 was an Al alloy with a layer thickness of 120 nm.

As shown in FIG. 10, the phase-difference-tracking output magnitude was as large as or larger than 0.25 V when the track pitch ranged from 0.6 μm to 0.8 μm. In this manner, an output level as high as that of the DVD-ROM can be obtained even when phase-difference tracking is employed. The optical phase-change recording medium 1 can thus be driven by a DVD-ROM player.

[10] Transparent Substrate Having Groove Width of 0.25 to 0.40 μm

FIG. 11 is a table chart showing phase-difference-tracking output magnitudes and jitters which were measured for different groove widths of the transparent substrate 2. Measurements shown in the table were obtained under such conditions as follows. The wavelength L of the laser light was 635 [nm], and the line density of the track was 0.3 [μm/bit]. Also, the signal format used for measurement was EFM modulation.

Further, the following is the specifics with regard to the optical phase-change recording medium 1. The recording layer 4 was AgInSbTe with a layer thickness of 17 nm. The upper protection layer 5 was formed from ZnS.SiO$_2$, and had a layer thickness of 20 nm. The lower protection layer 3 was made of ZnS.SiO$_{12}$, and a layer thickness thereof was 160 nm. Further, the heat releasing layer 6 was an Al alloy with a layer thickness of 120 nm.

As shown in FIG. 11, the phase-difference-tracking output magnitude was as large as or larger than 0.21 V, and jitters were just as favorable as they should be when the groove width of the transparent substrate 2 ranged from 0.25 μm to 0.40 μm. In this manner, an output level as high as that of the DVD-ROM can be obtained even when phase-difference tracking is employed. The optical phase-change recording medium 1 can thus be driven by a DVD-ROM player.

[11] Line Velocity for Recording and Reproducing Ranging 3 m/s–8 m/s

When the linear velocity of the optical phase-change recording medium 1 is set to 3–8 m/s with respect to the recording and reproduction of information, this achieves a linear velocity which is 1 to 2 times as fast as that of the conventional DVD ROM. This allows the optical phase-change recording medium 1 to be played by a DVD-ROM player.

In what follows, specifics of the embodiment of the present invention will be described.

The specifics of the optical phase-change recording medium 1 are as follows. The transparent substrate 2 is formed from polycarbonate (PC) with a refractive index of 1.58. On the transparent substrate 2, the lower protection layer 3 is formed from the ZnS.SiO$_2$ to have a layer thickness of 160 nm. On the lower protection layer 3, the recording layer 4 is provided by using Ag2In1OSb28Te6O, and has a thickness thereof equal to 17 nm. On the recording layer 4, the upper protection layer 5 is formed by using ZnS.SiO$_2$ with a layer thickness of 20 nm and a refractive index of 2.1. The heat releasing layer 6 is formed on the upper protection layer 5. A material of the heat releasing layer 6 is an Al alloy (Al—Ti: 1 wt %), and a thickness thereof is 120 nm. On the upper protection layer 5, the UV protection layer 7 is formed as the topmost layer based on UV-curing resin.

Figure 12:
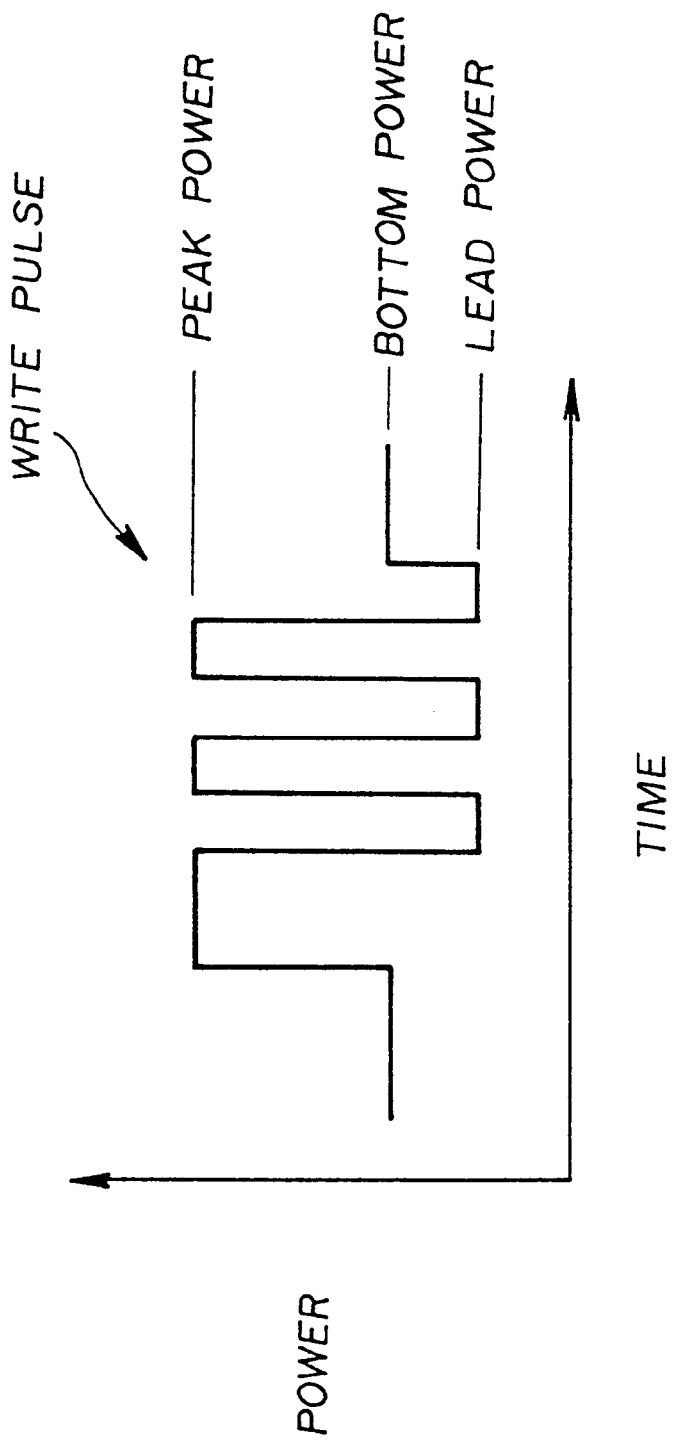
FIG. 12 is an illustrative drawing showing power of laser pulses used in an overwrite operation with respect to the optical phase-change recording medium according to the present invention.

A reproduction device, which reproduces information from the optical phase-change recording medium 1, is configured as follows. The wavelength L of the laser light is 635 [nm], and the numerical aperture NA is 0.6 with respect to an object lens of the optical pick-up device. The line density of the track is 0.3 [μm/bit]. Further, the laser beam at the time of an overwriting operation has a multi-pulse beam pattern with a peak power at 12 mW, a bottom power at 5 mW, and a lead power 1 mW as shown in FIG. 12. The figure shows 4T write pulses.

Further, the present invention is not limited to these embodiments, but various variations and modifications may be made without departing from the scope of the present invention.

The present application is based on Japanese priority application No.10-013661 filed on Jan. 27, 1998, with Japanese Patent Office, the entire contents of which are hereby incorporated by reference.

Further, the present application relates to a U.S. application Ser. No. 08/807632 filed on Feb. 27, 1997, with the United States Patent and Trademark Office, the entire contents of which are hereby incorporated by reference.

What is claimed is:

1. A product for recording information by use of a laser light, comprising:

a recording layer configured to change between an amorphous state and a crystalline state so as to record information, said recording layer having a thickness falling within a first range defined relative to a wavelength of the laser light;

a protection layer having a thickness falling within a second range defined relative to the wavelength of the laser light;

a metal layer having a thickness falling within a third range defined relative to the wavelength of the laser light; and a transparent substrate supporting said recording, protection, and metal layers, wherein the first, second, and third ranges are selected such that a phase of the laser light reflected by the amorphous state and a phase of the laser light reflected by the crystalline state have a phase difference larger than a predetermined phase amount, and the first range is between 0.023 times the wavelength of the laser light and 0.033 times the wavelength of the laser light.

2. The product as claimed in claim 1, wherein the predetermined phase amount is substantially 10°.

3. The product as claimed in claim 1, wherein the third range is between 0.13 times the wavelength of the laser light and 0.25 times the wavelength of the laser light.

4. The product as claimed in claim 1, wherein said protection layer is placed between said transparent substrate and said recording layer, and said second range is between 0.23 times the wavelength of the laser light and 0.28 times the wavelength of the laser light.

5. The product as claimed in claim 1, wherein said protection layer is placed between said recording layer and said metal layer, and said second range is between 0.026 times the wavelength of the laser light and 0.036 times the wavelength of the laser light.

6. The product as claimed in claim 1, wherein said recording layer includes Ag, In, Sb, and Te.

7. The product as claimed in claim 1, wherein a reflectivity of the amorphous state is greater than half a reflectivity of the crystalline state with respect to the laser light.

8. The product as claimed in claim 1, wherein said transparent substrate has grooves therein having a depth between 40 nm and 60 nm.

9. The product as claimed in claim 1, wherein said recording layer has tracks formed thereon, and a pitch of the tracks is between 0.6 μm and 0.8 μm.

10. The product as claimed in claim 1, wherein said transparent substrate has grooves therein having a width between 0.25 μm and 0.40 μm.

11. A method of recording and reproducing information in and from an optical phase-change recording medium, comprising recording and reproducing information in and from the product of claim 1 at a linear velocity falling within a range between 3 m/s and 8 m/s.

12. A method of forming an optical phase-change recording medium used for recording information by use of a laser light, comprising:

forming a recording layer configured to change between an amorphous state and a crystalline state so as to record information, such that said recording layer has a thickness falling within a first range defined relative to a wavelength of the laser light;

forming a protection layer having a thickness falling within a second range defined relative to the wavelength of the laser light;

forming a metal layer having a thickness falling within a third range defined relative to the wavelength of the laser light; and forming a transparent substrate for supporting said recording, protection, and metal layers, wherein the first, second, and third ranges are selected such that a phase of the laser light reflected by the amorphous state and a phase of the laser light reflected by the crystalline state have a phase difference larger than a predetermined phase amount, and the first range is between 0.023 times the wavelength of the laser light and 0.033 times the wavelength of the laser light.

13. The method as claimed in claim 12, wherein the predetermined phase amount is substantially 10°.

14. The method as claimed in claim 12, wherein the third range is between 0.13 times the wavelength of the laser light and 0.25 times the wavelength of the laser light.

15. The method as claimed in claim 12, wherein said protection layer is placed between said transparent substrate and said recording layer, and said second range is between 0.23 times the wavelength of the laser light and 0.28 times the wavelength of the laser light.

16. The method as claimed in claim 12, wherein said protection layer is placed between said recording layer and said metal layer, and said second range is between 0.026 times the wavelength of the laser light and 0.036 times the wavelength of the laser light.

* * * * *